Aug. 25, 1959  R. MALITTE  2,901,025
SEATS WITH RETRACTABLE LEG AND FOOT REST
Filed April 1, 1955  6 Sheets-Sheet 1

Inventor:
Robert MALITTE
by: J. Delattre-Seguy
Attorney

Aug. 25, 1959  R. MALITTE  2,901,025
SEATS WITH RETRACTABLE LEG AND FOOT REST
Filed April 1, 1955  6 Sheets-Sheet 2

Inventor:
Robert MALITTE
by: J. Delattre-Seguy
Attorney

Aug. 25, 1959  R. MALITTE  2,901,025
SEATS WITH RETRACTABLE LEG AND FOOT REST
Filed April 1, 1955  6 Sheets-Sheet 3

Inventor:
Robert MALITTE
by: J. Delater Segny
Attorney

Aug. 25, 1959     R. MALITTE     2,901,025
SEATS WITH RETRACTABLE LEG AND FOOT REST
Filed April 1, 1955     6 Sheets-Sheet 4

Inventor:
Robert MALITTE
Attorney

Aug. 25, 1959 R. MALITTE 2,901,025
SEATS WITH RETRACTABLE LEG AND FOOT REST
Filed April 1, 1955 6 Sheets-Sheet 5

Inventor:
Robert MALITTE
by: J. Delatre-Seguy
Attorney

Aug. 25, 1959   R. MALITTE   2,901,025
SEATS WITH RETRACTABLE LEG AND FOOT REST
Filed April 1, 1955   6 Sheets-Sheet 6

Inventor:
Robert MALITTE
by: J. Delattre-Seguy
    Attorney

United States Patent Office

2,901,025
Patented Aug. 25, 1959

2,901,025

SEATS WITH RETRACTABLE LEG AND FOOT REST

Robert Malitte, Chatenay-Malabry, France

Application April 1, 1955, Serial No. 498,695

Claims priority, application France July 8, 1954

2 Claims. (Cl. 155—111)

This invention relates to seats with retractable leg and foot rest; it is specially applicable to arm-chairs secured to a floor or other basework such as are used in aircraft, ships, land vehicles and in other fixed locations.

This invention relates more particularly to a chair comprising a seat having retractable leg and foot supports, movable from an operative position, wherein said supports extend forwardly of said seat, to an inoperative position, wherein it is stowed away in a forwardly-opening recess provided for it below said seat, and vice-versa, and comprising further resilient means adapted to urge said leg and foot supports from the inoperative position to the operative position, and remote control means for initiating the action of said resilient means.

As a feature of this invention, said resilient means consist in a double-acting spring which further cooperates in the movement of the leg and foot rest or support from its operative to its inoperative positions.

As another feature, locking means are provided to lock automatically the leg and foot rest respectively in its operative and inoperative positions, said remote control means releasing said locking means as they function in the inoperative position of the leg and foot rest.

As another feature, the leg and foot rest may comprise a frame section mounted for pivotal movement about a transverse tube at one end of a carrier, the other end of which is mounted for pivotal movement about a transverse shaft disposed across said recess.

As another feature, the double-acting spring mentioned above is of coil construction with projecting extremities and a projecting loop intermediate the latter, and is mounted around the transverse tube with its extremities on the one hand and its projecting loop on the other hand bearing respectively against a cross member on said frame section and against a cross member disposed in said recess, the disposition of said spring extremities and intermediate loop and of the cross members against which they bear being such that the spring is tensioned when the leg and foot support or rest is in both the operative and inoperative positions.

As another feature, a helical spring is mounted around the transverse tube and is adapted to displace the frame section laterally to centralize it relative to the recess on movement of the leg and foot rest from the operative to the inoperative position.

Other features of this invention will appear from the following description and from the accompanying drawings, illustrating one embodiment of this invention and in which:

Fig. 3a is a view, partially in cross-section, of the shaft 17 shown in Figs. 2, 3, 4 and 7;

Figure 1:
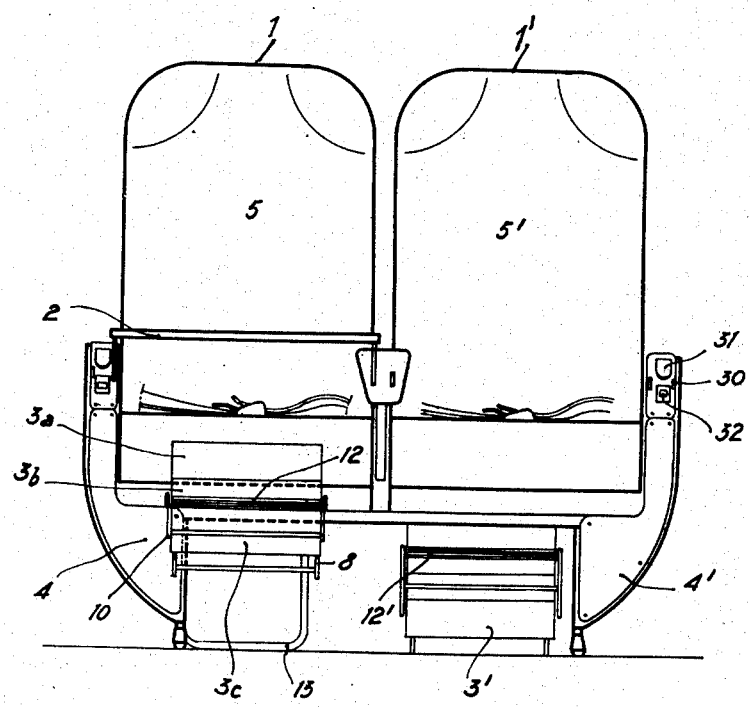
Fig. 1 is a front elevation of a pair of arm-chairs having seats equipped in accordance with the invention.
Figure 5:
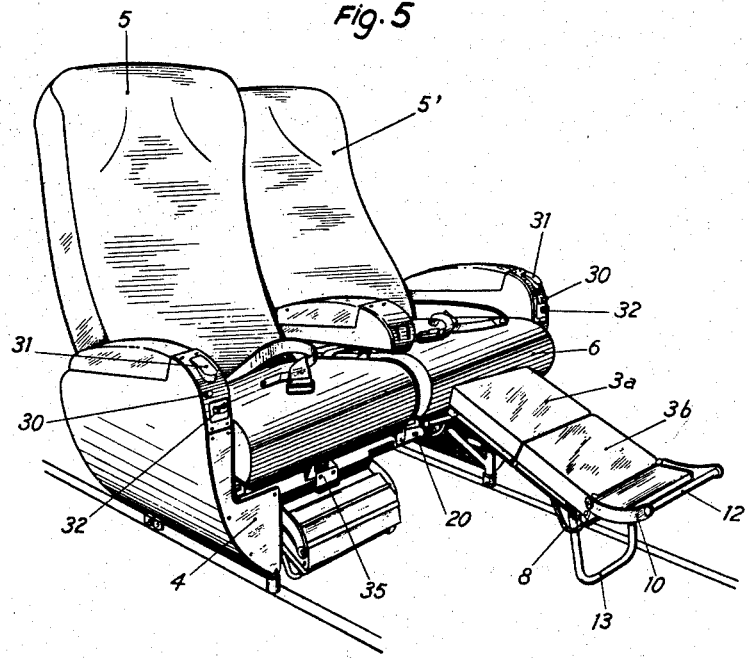
Fig. 5 shows in perspective two chairs and seats according to this invention, the leg and foot rests being retracted under one seat and extended in operative position in front of the other seat.

Referring to the drawings:

Figs. 1 and 5 show a pair of arm-chairs 1 and 1' which are identical, with backs 5 and 5' and seats 6; in Fig. 1, the chair 1 is shown ready for use with a service tray 2, while leg-support means 3 are unfolded into operative position in front of the chair and seat; and in the same Fig. 1, the chair and seat are shown with the rest 3' folded away into inoperative position under the seat 6; in Fig. 5, it is the rest 3' which is shown in operative position, while rest 3 is in inoperative position.

The frame of the chairs is protected on the outer side thereof by forward shields 4 or 4' (Figs. 1 and 5) which protrude inward under the seat 6.

In order that the leg and foot rest may be moved from operative to inoperative positions, it must be moved laterally of the median line of the seat, and in the case of a twin-chair, towards the center of the pair, in order to clear the adjacent edge of the corresponding forward shield 4 or 4'. Thus, in Fig. 1, the rest 3', in the stowed position, is displaced laterally relative to the median center line of chair 1', and the rest 3, in its operative position, is situated exactly centered on the median line of chair 1 (see also Fig. 5). As shown on Figs. 3, 4 and 7, a spring device 25 is mounted idle on the cross tube 15, which is fixedly connected to the frame 7 of the rest, for the purpose of effecting lateral displacement of the rest 3 or 3' relative to the corresponding chair when desired by the user, as more fully described hereafter.

Figure 2:
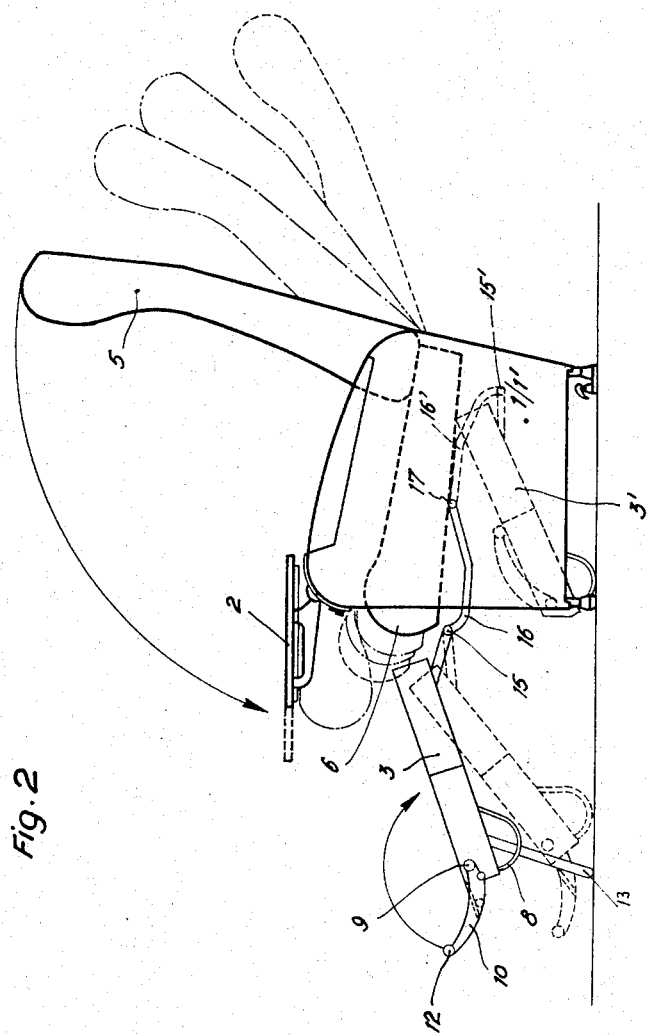
Fig. 2 is a diagrammatic side elevation of the chairs shown in Fig. 1, illustrating the various positions thereof according to this invention.

Fig. 2 shows, among other features, in varying types of line-drawing, the various positions which the back 5 and seat 6 of each chair may assume; the means and methods of controlling the positions of these parts are well known; they do not enter into the inventive concept herein, and no further reference will be made thereto.

The leg and foot rest 3 (or 3') comprises, in the example illustrated in Figs. 1, 2, 3, 4, 5 and 7, two cushions 3a and 3b fitted end to end on a frame 7, towards the front end of which are attached two tubular side runners 8. A support 10, articulated at 9 on the forward end of frame 7, carries a front cross-tube 11 on which is mounted a cylinder 12 which serves as a support for the feet of the user when the rest is in the unfolded or operative position (see Figs. 2 and 3, 4 and 5). An additional cushion 3c is provided beyond the cushion 3b, being mounted over support 10; it may be folded over into the positions 3'c (Fig. 4) by revolving support 10 around its articulations 9 towards the right in Fig. 4 (arrow Z) when it is desired to fold away the entire device into the stowed or inoperative position under the chair.

Figure 3:
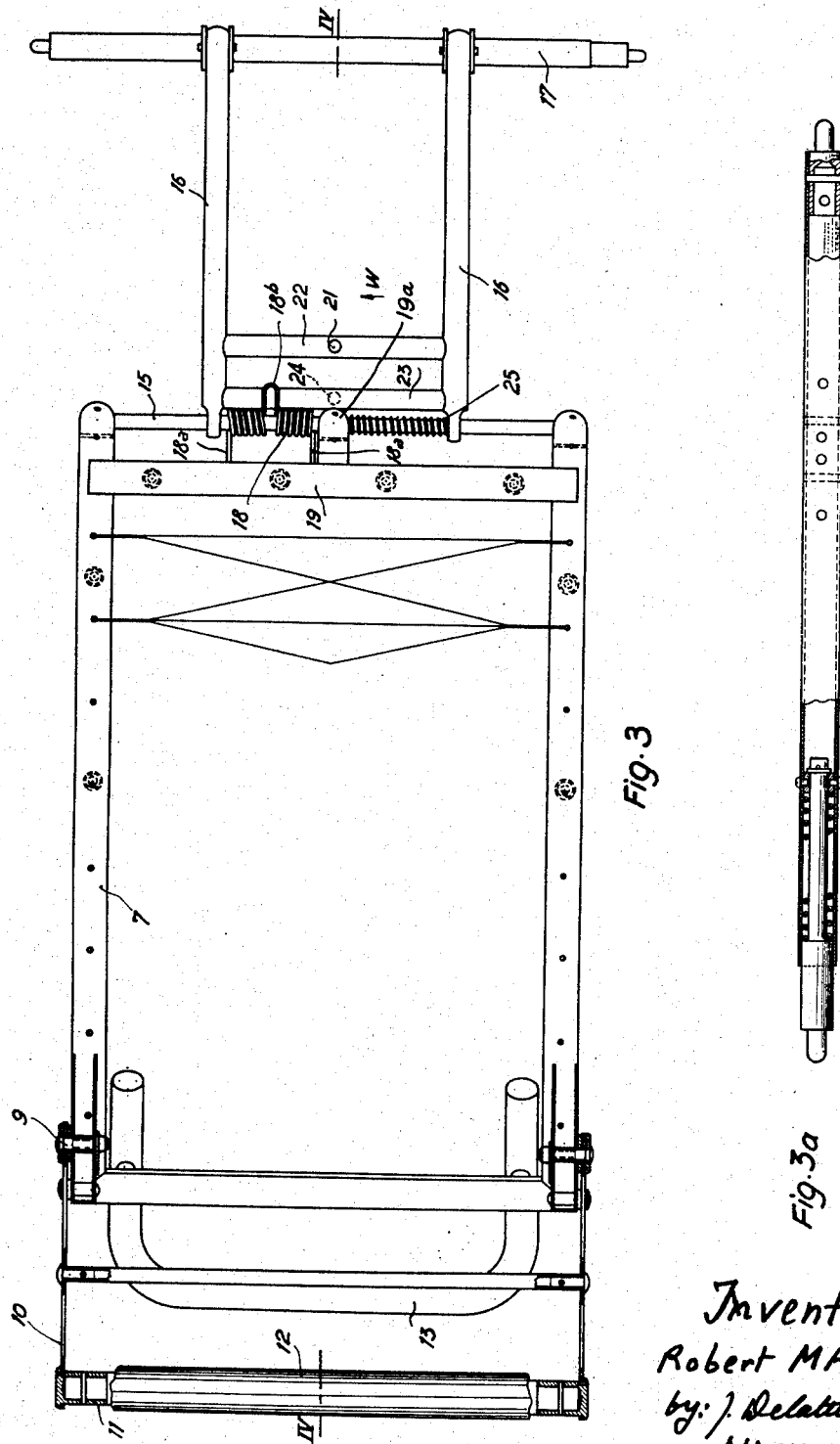
Fig. 3 is a detailed plan view of part of the mechanism actuating the leg and foot rest of one chair and seat.
Figure 4:
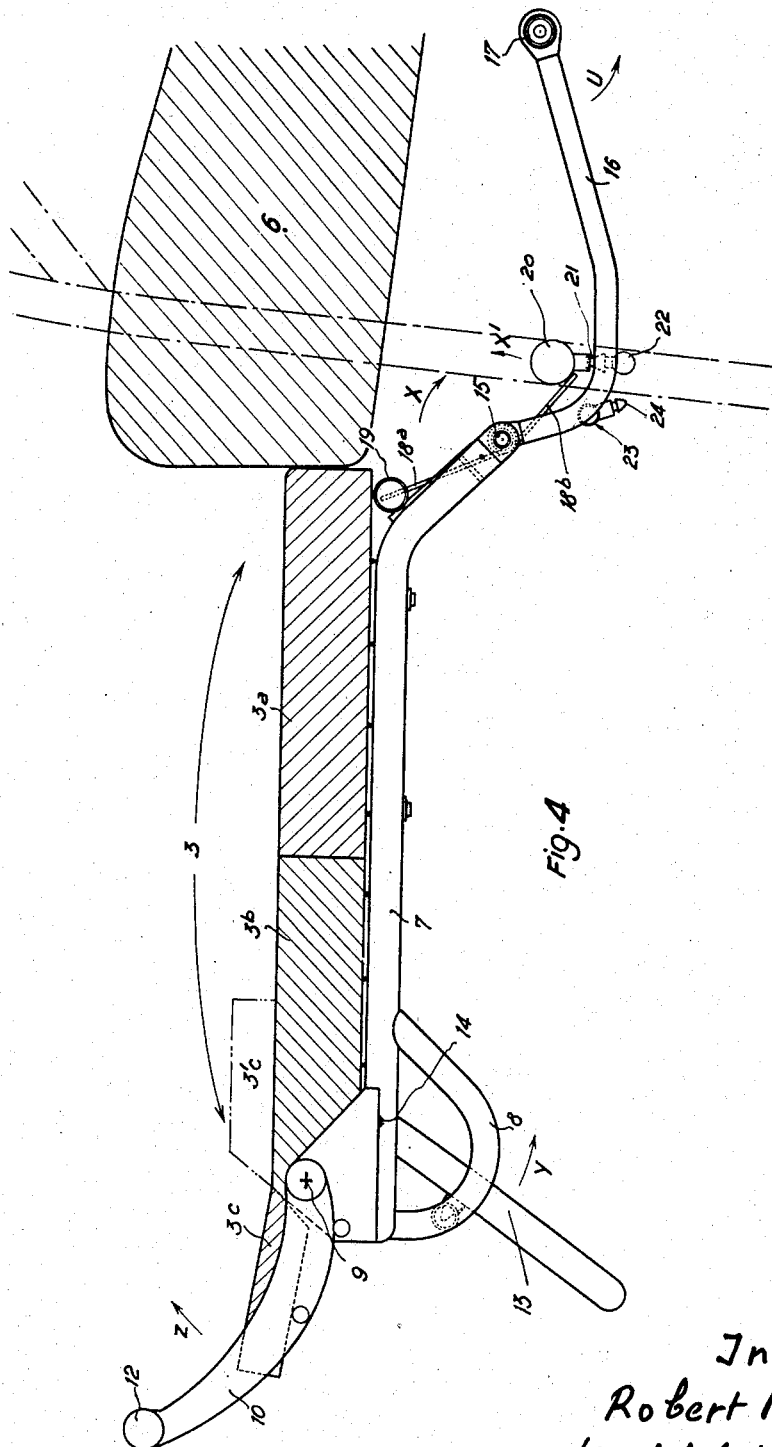
Fig. 4 is a vertical section taken on line IV—IV of Fig. 3.

A rigid tubular transverse support 13 is mounted under frame 7, at the forward end thereof (Figs. 1, 2, 3, 4, 5, 7), for swiveling movement at 14 (Fig. 4) and can be folded back beneath frame 7 into the inoperative or stowed position as indicated by the arrow Y (Fig. 4); in the position of use, support 13 occupies the position shown in Fig. 4 and supports the forward end of the entire leg-and-foot rest.

As shown in Figs. 2, 3, 4 and 7, the frame 7 can swivel by means of a cross-tube 15 on a double-crank frame 16, forming a carriage, and itself is capable of swiveling on a shaft 17 fixedly mounted on the frame of the chair 1 or 1' and extending transversely across the forwardly-opening recess provided under the seat 6, for stowing away the rest. Shaft 17 is of telescopic construction (Fig. 3a) and can be dismantled (Fig. 7) so that it may be withdrawn from the recess under the seat together with the entire leg and foot rest.

Figure 7:
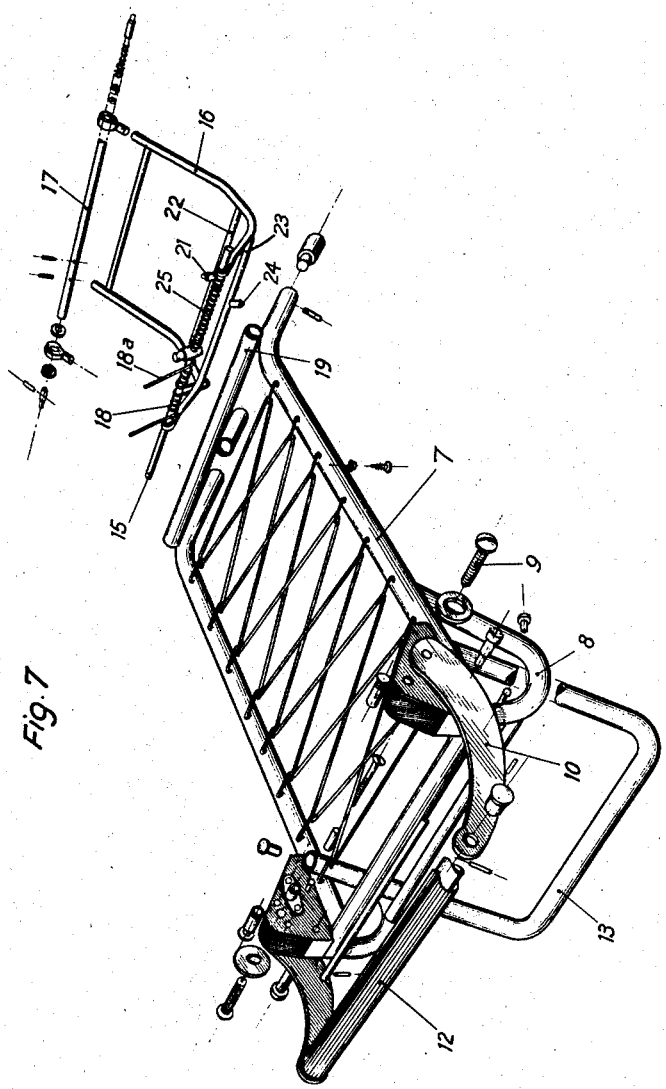
Fig. 7 is a perspective view, with some parts detached for clarity, of the leg and foot rest mechanism illustrated in Figs. 2, 3 and 4.

The double-crank frame 16, as shown in Figs. 3 and 7, is also provided with an additional cross-tube 23 to which is welded a stud 24, the function of which is to lock the leg and foot rest in its folded or stowed position, as will be more fully explained hereafter.

Frame 16 cannot move laterally in the frame of the chair.

Figure 6:
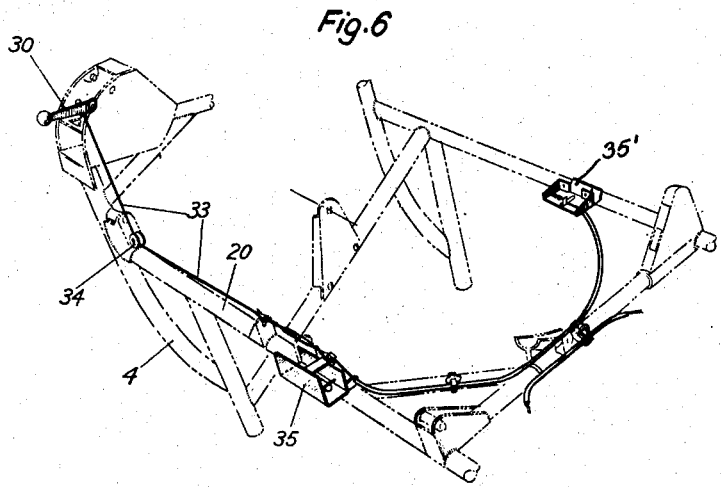
Fig. 6 shows in perspective the remote control means for initiating the action of the means urging the leg and foot rest from inoperative to operative position, with respect of one seat.

In Fig. 5, there are shown: at 31, the usual, well known means to control the inclination of the back of the seat, which will not be described further; at 32, an accessory, such as an ash-tray, not described further; at 30, the small lever controlling, at the will of the user, the position of the leg and foot rest; this lever 30 is also shown on Fig. 6 and the means of control will be more fully described hereafter. The foregoing elements are also identified on Fig. 1.

There are provided a cross-tube 19 integral with frame 7 (Figs. 3 and 4) and a rigid tubular cross-piece 20 which is fixed and connected to the frame of the chair under it and extending across the stowing recess, towards the front thereof (Figs. 4, 5, 6).

A double acting spring 18 is mounted around cross tube 15 (Figs. 4, 7). The identical extremities 18a of spring 18 are supported inside cross-tube 19 (Fig. 4). The center loop projection 18b of spring 18 bears against and under cross-piece 20 and extends above and over cross-tube 23 (Fig. 4).

The tension of spring 18 tends to close it in the direction of arrows X and X' (Fig. 4). Loop projection 18b bears against element 20 when the foot rest is extended and against cross-tube 23 when the foot rest is retracted. Cross-tube 19 is provided, intermediate its length, with a projecting member 19a (Fig. 3); spring 18 is mounted on cross-tube 15 between said projecting member 19a and one side of frame 16 (Fig. 3). Projecting member 19a abuts cross-tube 15 on the top side thereof (Fig. 3), and is fixedly attached to cross-tube 19. A spring 25 is mounted idle on cross-tube 15, on the end thereof between member 19a and the second side of frame 16 (Fig. 3). The ends of spring 25 are free and merely abut said second side of frame 16 and said member 19a, and said spring 25 serves to move member 19a laterally of fixed frame 16, when spring 18 closes upon itself for stowing the frame 7 under the seat 6 according to arrows X, X' of Fig. 4. This moves frame 7 transversely and laterally relative to fixed frame 16 to permit stowing the foot rest in the recess under seat 6. Moreover, spring 18 is adapted, when it is allowed to close upon itself (arrows X and X', Fig. 4), and by virtue of the support provided by fixed cross-piece 20, to effect a downward angular displacement of frame 7 with the cushions and associated parts, until the cushion 3a has come down to the level of the recess provided under seat 6 to retract frame 7, cushion 3a and associated parts.

As shown in Fig. 4, the parts 7 and 16 are secured in the operative position illustrated by a stud 21 mounted on a secondary cross-tube 22 of the double-crank system 16. In this position, stud 21 is held in a recessed member, such as a spring-latch box 35 (see Fig. 6) fixedly attached to the fixed tube 20, thus locking the entire moving parts (system 16, frame 7 and associated parts) in the relative positions shown in Fig. 4.

In the stowed away position of frame 7 and of the entire leg support device, which position is shown at 3' in dotted lines in Fig. 2, the leg-support device is locked by the stud 24 which engages a recess, such as spring latch box 35' provided for that purpose on a fixed element at the rear of the chair (see Fig. 6). Spring-latch boxes have long been known and their detailed construction is not new.

Referring to Fig. 6, the release of studs 21 and 24 from boxes 35 and 35' respectively is effected by means of flexible cable 33 controlled by the user's control handle or lever 30. Cable 33, known as a Bowden cable, passes under roller 34, and is then connected successively to the spring-latches of boxes 35 and 35'. This allows the user to control the operation of the leg-and-foot rest by the release of studs 21 and 24 from the spring latches of boxes 35 and 35'. In the embodiment shown, the operation of cable 33 releases at the same time studs 21 and 24, but it will be understood that such release is operatively effective only on one of said studs, 24 for stowing away, or 21 for the useful position of the rest, one or the other of said studs and corresponding spring-latch box being idle.

The operation of the device and object of this invention can be explained as follows:

The position of locked stowing-away corresponds to that illustrated in Fig. 2, where the leg support 3' is stowed away under seat 6; in that position, the foot-rest 9, 10 and 12 has been folded back flat onto cushion 3; the support 13 has been folded back under frame 7; the retractable frame 7 and associated parts rest on the floor on the side runners 8; in that position, the double-crank frame 16 has swiveled around fixed shaft 17 into the position shown at 16' and shaft 15 is then located at 15' (Fig. 2); frame 7 and the double-crank frame 16 form an acute angle; spring 18 is almost completely closed, under maximum tension, since its loop 18b bears on cross-tube 23, while its extremities are enclosed in cross-tube 19. Then the locking is effected by means of stud 24 which is latched in spring-latch box 35'.

When the user wishes to put the leg rest in its useful position, he operates handle 30 and cable 33 which releases stud 24 from box 35'; spring 18 is free to expand; it opens with all its strength, opening simultaneously the angle formed by frame 7 and double-crank frame 16, and pushes frame 7 and leg and foot rest 3, sliding on runners 8, to the position shown in dotted lines at the left of Fig. 2. The inertia of the device favourises this movement initiated by the release of spring 18, while spring 25 operates to move the leg rest laterally into its centered position relative to the seat. Because of the inertia of the device, spring 18, the loop 18b of which has come in contact with fixed cross-piece 20, opens up fully and raises cross-tube 19, frame 7 and the cushion 3 to the position shown in Fig. 4, or at 3 in Fig. 2, where the leg rest is in high useful position. All the user needs to do next is to unfold and set in place support 13 and foot rest 10—12. In that end, operative position of the leg rest, stud 21 latches in latch box 35. Also, the spring 18 is then tensed in fully open position (Fig. 4).

Considering the leg-rest device unfolded in the operative position, as shown in Fig. 4, to retract said device to the inoperative or stowed position under the chair seat 6, the user first folds over the foot support 10 with cushion 3c, then folds back the leg 13; then the user operates again the handle 30, to release stud 21 from box 35; at that time, spring 18, beginning to untension itself, begins to close upon itself as indicated by arrows X—X' (Fig. 4) and by virtue of the support provided by fixed tube 20, draws downwards cross-tube 15, cross-tube 19, with frame 7, cushions and associated parts, until cushion 3a reaches the recess provided under seat 6. At that time, spring 18 is completely untensioned, and then, the user must help in the retraction of the leg and foot rest by its inertia, by helping the lateral displacement of frame 7 against the resistance of spring 25 to bring the frame 7 and associated parts in front of the recess; at this point the lowering of frame 7 has produced an angular displacement of this frame relative to the double-crank system 16 about shaft 15 and spring 18 has reached the neutral position. The user now needs merely to push the leg-rest device backwards towards its stowed or inoperative position; this action, however, causes the double-crank 16 to pivot on its fixed shaft 17 in the direction of arrow U (Fig. 4), i.e. towards the rear of the seat; double-crank 16 draws with itself the frame 7 and the entire leg-rest device, which reach the position 3' (Fig. 2); at that time, stud 24 latches in box 35', which locks the frame 7, and the entire leg-rest device in its stowed position; at that point spring 18 is reset in its closed tensioned position which prepares the system for being pushed into operative position (see above).

What I claim is:

1. A chair comprising a pair of laterally-spaced side support means, a seat bridging between said pair of support means above the base level of said support means, said seat and said support means forming a forwardly-opening recess below said seat; leg-support means movable from an operative position wherein it forms a forward continuation of said seat to an inoperative position wherein it is stowed in said recess, and vice versa; a double-acting spring tensioned in each position of said leg-support means to urge the latter to its other position; first lock means automatically acting to lock said leg-support means against the action of said spring in the inoperative position; second lock means acting automatically to lock the leg-support means against the action of said spring in the operative position; first remote control means actuable by the operator to release said first lock means to initiate movement of said leg-support means to the operative position; second control means actuable by the operator to release said second lock means to initiate movement of said leg-support means to the inoperative position; in said leg-support means, a transverse shaft mounted between said laterally-spaced side support means; a carrier mounted for pivotal movement at one of its ends about said transverse shaft; a transverse tube on the free end of said carrier, a frame section mounted for pivotal movement about said transverse tube, a first cross member on said frame section, and a second cross member mounted across said carrier; said double-acting spring being of coil construction with projecting extremities and a projecting loop intermediate the latter, said double acting spring being mounted around said tube with its extremities on the one hand and its projecting loop on the other hand bearing respectively against said first and second cross members, the disposition of said spring extremities and intermediate loop and of said cross members being such that the spring is tensioned when the leg-support means is in both the operative and inoperative positions.

2. A chair as claimed in claim 1, in which a helical spring is mounted around said tube and is adapted to displace said frame section laterally to center the same relative to said recess on movement of the leg-support means from the operative to the inoperative position.

References Cited in the file of this patent

UNITED STATES PATENTS

| | | |
|---|---|---|
| 158,637 | Head | Jan. 12, 1875 |
| 2,507,807 | Newbern | May 16, 1950 |
| 2,514,447 | Hendrickson | July 11, 1950 |
| 2,775,996 | Millar | Jan. 1, 1957 |